(12) United States Patent
Crane (10) Patent No.: US 7,061,149 B2
(45) Date of Patent: Jun. 13, 2006

(54) ROTARY ELECTRICAL MACHINES

(75) Inventor: Allan David Crane, Rugby (GB)

(73) Assignee: Alstom Power Conversion Ltd., Warwickshire (GB)

( * ) Notice: Subject to any disclaimer, the term of this patent is extended or adjusted under 35 U.S.C. 154(b) by 0 days.

(21) Appl. No.: 10/311,027

(22) PCT Filed: Apr. 12, 2002

(86) PCT No.: PCT/GB02/01696

§ 371 (c)(1),
(2), (4) Date: May 23, 2003

(87) PCT Pub. No.: WO02/084843

PCT Pub. Date: Oct. 24, 2002

(65) Prior Publication Data

US 2003/0178896 A1   Sep. 25, 2003

(30) Foreign Application Priority Data

Apr. 12, 2001   (GB) .................................. 0109179.2

(51) Int. Cl.
    *H02K 11/00* (2006.01)
(52) U.S. Cl. ...................................................... 310/71
(58) Field of Classification Search .................. 310/71, 310/68 R, 219, 127, 67 R, 260
    See application file for complete search history.

(56) References Cited

U.S. PATENT DOCUMENTS

| | | | |
|---|---|---|---|
| 1,485,304 A * | 2/1924 | Shoemaker | ................. 188/295 |
| 3,160,771 A | 12/1964 | Martin et al. | |
| 4,749,933 A | 6/1988 | ben-Aaron | |
| 5,491,370 A | 2/1996 | Schneider et al. | |
| 5,900,687 A * | 5/1999 | Kondo et al. | ................. 310/71 |
| 6,300,697 B1 | 10/2001 | Findeisen et al. | |
| 6,369,473 B1 * | 4/2002 | Baumeister et al. | .......... 310/71 |
| 6,570,365 B1 * | 5/2003 | Hsu | ............................ 322/37 |
| 6,600,244 B1 * | 7/2003 | Okazaki et al. | ............... 310/71 |

FOREIGN PATENT DOCUMENTS

| | | |
|---|---|---|
| DE | 34 09 333 A1 | 9/1985 |
| DE | 198 12 019 A1 | 9/1999 |
| EP | 0 452 037 A1 | 10/1991 |
| EP | 0 936 729 A1 | 8/1999 |
| GB | 1 117 329 | 6/1968 |
| GB | 1 236 756 | 6/1971 |
| GB | 1 485 304 | 9/1977 |

* cited by examiner

*Primary Examiner*—Darren Schuberg
*Assistant Examiner*—Nguyen Hanh
(74) *Attorney, Agent, or Firm*—Kirschstein, et al.

(57) ABSTRACT

An electrical machine, such as an induction motor, comprises a stator having a plurality of conductive windings spaced around an axis of rotation, a rotor rotatable about the axis of rotation in response to the flow of current through the stator windings, and a plurality of switching assemblies provided at circumferentially spaced locations around the stator. Each switching assembly is electrically connected between an end of at least one of the windings and a power supply busbar ring assembly comprising at least one conductor. The busbar assembly connects the electrical supply to one or more of the switching assemblies, each of the switching assemblies being effective to selectively control the supply of current to at least one of the windings.

16 Claims, 10 Drawing Sheets

| Coil Type | Supply | Coil Ends | Supply Type | Switches Coil In | Switches Coil Out | CIRCUIT | CODE No |
|---|---|---|---|---|---|---|---|
| Diamond | DC | Same | 2 Wire DC | YES 1 | NO |  | 1 |
| | | | 2 Wire DC | YES 1 | YES 1 |  | 2 |
| | | Opposite | 2 Wire DC | YES 1 | NO |  | 3 |
| | | | 2 Wire DC | YES 1 | YES 1 |  | 4 |
| | AC | SAME | 3φAC + N | YES 3 | NO |  | 5 |
| | | | 3φAC + N | YES 3 | YES 1 |  | 6 |
| | | | 3φ AC | YES 3 | YES 3 |  | 7 |
| | | Opposite | 3φAC + N | YES 3 | NO |  | 8 |
| | | | 3φAC + N | YES 3 | YES 1 |  | 9 |
| | | | 3φAC Twice | YES 3 | YES 3 |  | 10 |
| BAR | DC | Opposite | 2 Wire DC | YES 1 | NO |  | 11 |
| | | | 2 Wire DC | YES 1 | YES 1 |  | 12 |
| | AC | Opposite | 3φAC + N | YES 1 | NO |  | 13 |
| | | | 3φAC + N | YES 3 | YES 1 |  | 14 |
| | | | 3φAC Twice | YES 3 | YES 3 |  | 15 |

*Fig. 8*

ROTARY ELECTRICAL MACHINES

FIELD OF THE INVENTION

This invention relates to improvements in rotary electrical machines, and in particular but not exclusively to a rotary machine such as an electric motor or generator with integral control circuitry.

BACKGROUND OF THE INVENTION

Rotary machines are widely used in industrial applications for converting electrical energy into rotational movement (in the case of a motor) or for producing electrical energy from rotational movement (in the case of a generator). To a large extent the requirements for the design of electric motors and generators are the same and so only the case of electric motors will be described in detail hereinafter.

Many applications require the provision of a variable-speed rotary machine. Although a large number of different types of electrical machine are known, the most widely used motor type for high power applications are AC synchronous and AC induction motors. Both AC synchronous and AC induction motors comprise a central rotor which is disposed about an axis of rotation within a stator assembly. A magnetic field rotating at synchronous speed is produced by passing current along electrical conductors arranged in a pattern around the stator. The magnetic field penetrates the air gap between the stator and the rotor and in turn causes the rotor to rotate. The field-generating electrical conductors are usually stator winding elements (variously called "windings", "field windings", or "coils") and typically consist of many turns of electrical wire wrapped around a former or stator core. However, straight bar-shaped field-generating conductors may also be used in some situations, their ends being connected together across the stator ends to form the required electrical circuits.

To generate the high flux densities needed in many applications the windings are usually grouped together in a fixed configuration in a predetermined number of phases. Each winding in a given phase is driven with the same current waveform if the windings are connected in series, or with the same voltage waveform if they are connected in parallel.

Figure 7:
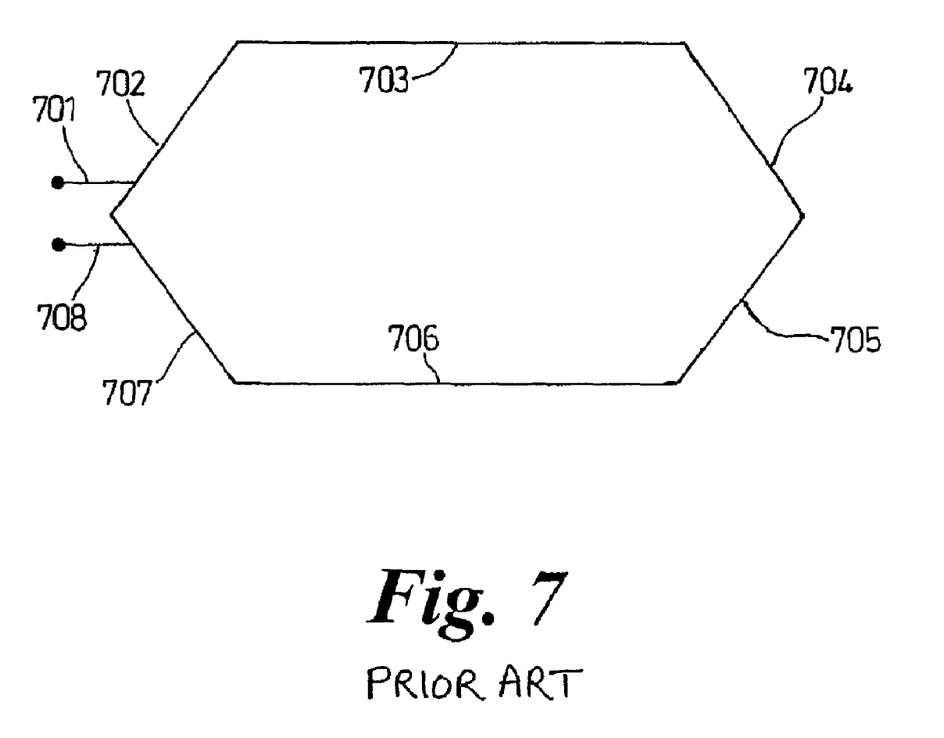
FIG. 7 illustrates the configuration of a conventional diamond pattern field winding for a machine.

The windings in a machine stator are normally shown diagrammatically in the shape of a diamond as illustrated in FIG. 7 of the accompanying drawings. Each winding comprises an input terminal 701 at the start of the conductor used to form the winding. The conductor is arranged in a loop having portions 702 to 703 to 704 to 705 to 706 to 707 and back to 702, and this loop is usually repeated a number of times to form a coil. Finally, an output terminal 708 is provided at the end of the coil. Each conductor may comprise a bundle of many individually insulated copper wires, the bundle being covered with an insulating sleeve.

Two side portions 703 and 706 of the winding lie parallel to the axis of the machine and are responsible for producing the rotating flux. The remaining portions 702, 704, 705, and 707 are used to interconnect the two sides 703 and 706 and do not produce useful flux. These portions are commonly referred to as the "coil overhangs" or "end windings".

To group the individual windings together into phases, the stator includes conductive links that connect the overhanging ends of the windings after they have been produced. This connection process is costly and time consuming. The connections are normally provided at one end of the stator and the overhang connections can add significantly to the overall length of a complex high power machine.

A problem with prior art machines of this type arises if a short circuit occurs across the windings, or a wire inside a winding breaks, giving an open circuit. Short-circuiting can also occur due to faults external to the windings. When a short circuit fault arises the machine may need to be stopped to permit removal of the short circuit, since a closed loop around a winding will generate an undesirable braking torque that will prevent correct operation of the machine.

Similarly, a wire breaking inside a winding will affect all the associated windings and will require the machine to be stopped for repair.

For steady state operation, crude control of the machine is possible by connecting the windings together to form three phases and applying a respective phase of a three-phase electrical supply to each of the winding phases. The machine will rotate at a steady speed determined by the frequency of the waveform—usually 50 or 60 Hz—and the arrangements of the windings.

If a variable speed is needed the speed of rotation of the magnetic field must be varied by changing the waveforms applied to each of the phases. This is performed by a control circuit—often referred to as a converter—which receives a voltage supply as an input and produces as an output the waveforms needed for each phase of the machine. Many different converter circuits are known in the art and further details of operation of converters are not necessary for understanding of the present invention.

For a machine made with three phases, if a fault occurs in one phase the machine will be unable to operate either on a fixed or a variable frequency supply.

To avoid this problem, machines can be made with more than three phases, e.g. six or nine phases. For machines with increased numbers of phases, if a fault occurs in a phase of the machine, the converter can automatically isolate a phase and in many cases continue to run the machine at a reduced torque. However, this is a crude form of protection, as a fault in a single winding will require a complete machine phase to be isolated.

Alternatively, it has been proposed to incorporate one or more switches into the wiring that connects together the windings into phases. These switches—which can simply be switched between a conductive state and a non-conductive state—either connect or isolate windings from their respective phases. The switches are closed for normal operation, but when a fault is detected the switches are opened as required to isolate the faulty winding or windings. The switches do not change the shape of the current flowing in the windings—they can only switch the current on or off.

The invention aims to provide an electrical rotating machine in a more useful and convenient form by combining electric power switching and busbar technology to facilitate reduction of stator length, and to enable reconfiguration of stator windings and change of their flux generating characteristics while the machine is operating.

SUMMARY OF THE INVENTION

In accordance with the present invention there is provided an electrical machine comprising: a rotor; a stator having a plurality of field-generating conductors; at least one ring-shaped busbar for supplying power to the field-generating conductors; a plurality of switch means angularly spaced apart around the stator and connected between the at least one busbar and the field-generating conductors; and control means for selectively operating the switch means to control current in the field-generating conductors and thereby control operation of the machine.

Alternatively stated, the electrical machine comprises:

a stator assembly having a plurality of field-generating conductors arranged around an axis of rotation, a rotor adapted to rotate about the axis of rotation in response to flow of current through the field-generating conductors, a plurality of switch means provided at angularly spaced-apart locations around the stator assembly, each switch means being connected to an end of at least one of the field-generating conductors; and a power supply ring assembly comprising at least one ring-shaped busbar for supply of power to the switch means, each of the switch means being effective to selectively control supply of current to at least one of the windings.

Of course, by mentioning ring-shaped busbars, it will be appreciated that we mean any conductive track that extends continuously around the stator to electrically interconnect the switch means that are disposed at the spaced locations around the stator.

A control means is provided to selectively operate each switch means between a conductive state and a non-conductive state to control current in the field-generating conductors and thereby control operation of the machine.

The switch means preferably comprise solid-state semiconductor switches. These may be integrated with the stator assembly and may be configured to control the waveform shape of the current flowing in the field-generating conductors by rapid opening and closing of the switches. The electrical machine, which may be a motor, and the converter needed to drive it, are therefore conveniently integrated into one composite assembly, which saves space.

The switch means may also be used to isolate an end of a field-generating conductor from the supply in the event of a fault in the winding.

At least one of the ring-shaped busbars is provided at one or both ends of the stator and in fact a plurality of busbars may be arranged concentrically with each other at one or both ends of the stator. In particular, there may be a plurality of busbars for supplying a corresponding plurality of electrical supply phases to the field-generating conductors, each switch means comprising a corresponding plurality of switches, whereby the field-generating conductors are selectively connectable to any one of the plurality of electrical supply phases.

The field-generating conductors may comprise coil windings or straight bars, as known per se.

Two busbars may be used to connect opposing polarities of a DC supply to the switch means. The DC supply may be derived from an AC supply.

In a most preferred embodiment, three ring-shaped busbars are used to carry the three phases of an AC supply to the switch means. A fourth busbar ring may be provided for connection to a neutral or earth point.

Each of the busbars may be connected to each of the switch means, or to a subset of the switch means.

The ring-shaped busbars coupled to the switch means removes the need for bulky cabling between a separate PWM control stage and the stator end-windings as is required in the prior art.

To complete the circuit for the flow of current around a field-generating conductor in the stator, switch means may be provided at each end of the conductor, with a first one of the switch means connecting a first end of the conductor to a busbar having a first DC polarity whilst the switch means at the other end connects the conductor to a busbar of opposite DC polarity.

By changing the state of the switches comprising the switch means it is possible to control the waveform shape of current flowing through each of the stator winding elements. As already mentioned, one control method which can be used is conventional pulse width modulation control (PWM). However, it will be understood that the invention is not limited to this form of control.

The control means may control each of the switches individually or they may be controlled in sets, with each switch in the set being in the same state.

The control means may comprise an integral part of the stator assembly or may be provided separately from the stator assembly. Where the stator assembly is provided with a housing which at least partially encloses the stator the housing may also accommodate the power supply busbars, the switch means and the control means.

It is especially preferred that one busbar is provided for each phase of the input supply.

For a poly-phase supply the busbars may be concentrically nested with each other at one end of the machine. This is preferred as it produces a machine assembly of minimum axial length. Alternatively, the rings may be stacked axially adjacent to one another. This produces a machine of greater axial length but would allow identically sized rings to be used.

As an example of an arrangement in which at least one busbar ring is provided at each end of the stator, one or more busbar rings may be provided at a first end of the stator to carry a sub-set of the total set of phases of the input electrical supply to switch means located around the stator and connected to the ends of field-generating conductors. At the opposite, second, end of the stator one or more additional rings may be provided to carry the remaining phases of the input supply to further switch means connected to different ones of the field-generating conductors.

In a modification, at least one of the busbar rings at the first end of the stator may carry current that is in phase with that carried by a ring at the other end of the stator.

It is preferred, but not essential, that the maximum circumference of each busbar is less than or equal to the maximum circumference of the stator.

Each field-generating conductor may either be connected to a first one of the switch means at its first end and to a permanently connected return supply at its second end, or each conductor may be connected to switch means provided at both ends.

It will also be appreciated that the position of the switch means may be dependent upon the location of the ends of the field-generating conductors. In a most convenient arrangement for coil windings, both ends of each winding may terminate at the same end of the stator, in which case all of the switch means may be provided at that same end of the stator. Alternatively, the ends of the windings may terminate at opposite ends of the stator and switch means may be provided at one or at both ends of the stator and connect to respective ends of the windings. This requires some of the windings to complete a full turn around the stator (or an integer multiple number of turns) and other windings to complete a half turn of the stator (or an integer multiple number of turns plus one half turn).

An important alternative avoids the use of coil-type windings and instead uses a set of single straight conductors passing from one end of the stator to the other. The single conductors may be connected to a switching assembly at one end only or at both ends. The advantage of this arrangement is the elimination of the overhangs at the ends of the machine making it even more compact. Each of the switch means may comprise at least one switch that feeds one or more of the conductors connected in parallel.

Instead of connecting stator windings or bars to switch means on a one-to-one basis, it would be possible to connect a group of such field-generating conductors to one switch means.

The field-generating conductors may be supported by a former having a plurality of axially extending grooves or slots provided therein at peripherally spaced locations. The slots locate and support the conductors and if made of magnetic material the former will control the path of magnetic flux produced by current in the conductors.

The circumferentially spaced locations of the stator slots may correspond to the spaced locations of the switch means. Alternatively, the slots may be circumferentially offset from the switch means by an appropriate distance.

The switches within each switch means may be supported by an electrically insulating substrate which may comprise a heat-sink or have a heat-sink attached thereto.

In one convenient arrangement, each heat-sink is adapted to receive coolant from, and return it to, respective toroidal manifolds which encircle the stator or the switch means adjacent the outer circumference of the stator. Such manifolds may also convey coolant to channels in the stator for combined cooling of the switch means and the field windings or bars.

The coolant may be cooling air provided from a dedicated supply or another part of the machine.

It should be noted that the above-mentioned coolant manifolds can provide support to the switch means.

Each of the switches of a switch means may comprise one or more power semi-conductor switching devices such as an IGBT, MOSFET etc.

BRIEF DESCRIPTION OF THE DRAWINGS

There will now be described, by way of example only, some embodiments of the present invention with reference to the accompanying drawings, in which.

DETAILED DESCRIPTION OF PREFERRED EMBODIMENTS

Figure 1:
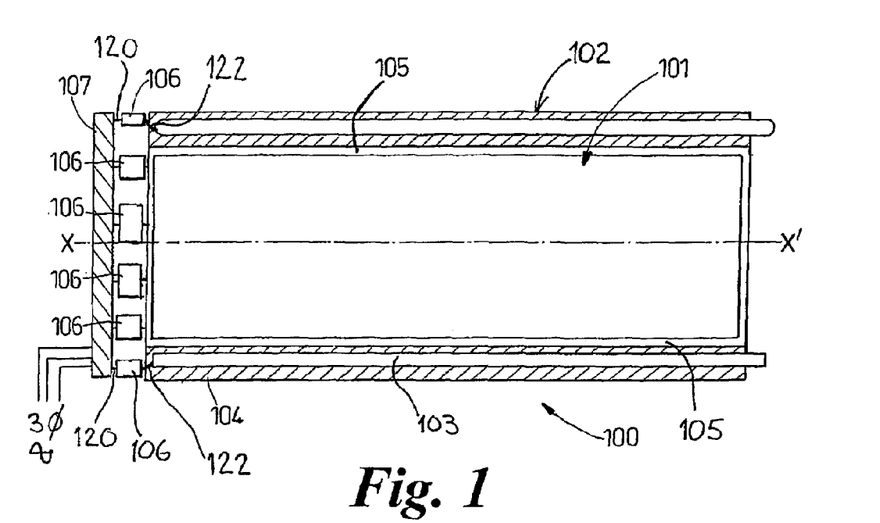
FIG. 1 is a part-sectional plan view of a first embodiment of an induction motor in accordance with the present invention.

The electrical machine illustrated in FIG. 1 of the accompanying drawings comprises an AC induction motor assembly 100. The assembly 100 includes a central rotor 101 which as known is supported at its axially opposed ends for rotation about an axis XX' by means of bearings on a central shaft (not shown). A stator 102 surrounds the rotor 101 and comprises a former 104 for receiving and holding the field-generating conductors 103. The former 104 is a generally elongate tubular structure so that the inside of the tube accommodates the rotor 101. A small air gap 105 is provided between the rotor 101 and the former 104.

The former 104 includes a plurality of grooves or slots which extend in a known manner axially from one end of the former 104 to the other. In the present embodiment, each slot accommodates a field-generating conductor 103 which takes the form of a field winding. The cross-sectional view of FIG. 1 shows only two diametrically opposed field-generating conductors 103 in their respective slots, but many more are provided in slots located at equi-angularly spaced-apart positions around the former 104.

Each slot, together with a corresponding but circumferentially non-adjacent slot, accommodates a number of turns of a single length of conductor 103. A first end of the conductor is located at a first end of the former (the left-hand end in the drawing) in a first one of the slots and the conductor extends axially to the other end of the slot, extends around the second end of the former 104 to a second slot which is circumferentially non-adjacent to the first slot, and then returns to the first end of the former along the second slot, so that the second end of the conductor is located at the first end of the former in the second slot. This forms a loop of the field-generating conductor. Hence, both ends of the conductor 103 are arranged at one end of the former (the left end as illustrated), so that they may be connected as described below to complete an electrical (field-generating) circuit. The above describes only one turn of a field winding, but of course, if desired, the conductor may be wrapped many times around the slots to form a coil winding. However, no matter how many turns of the winding are present in the slots, the present embodiment of the invention requires both ends of the conductor to be located at the same end of the former 104.

At the same end of the former 104 as the ends of the winding conductors are a plurality of semiconductor switching assemblies 106 and a power supply busbar ring assembly 107. These features are illustrated in greater detail in FIG. 2 of the accompanying drawings.

Figure 2:
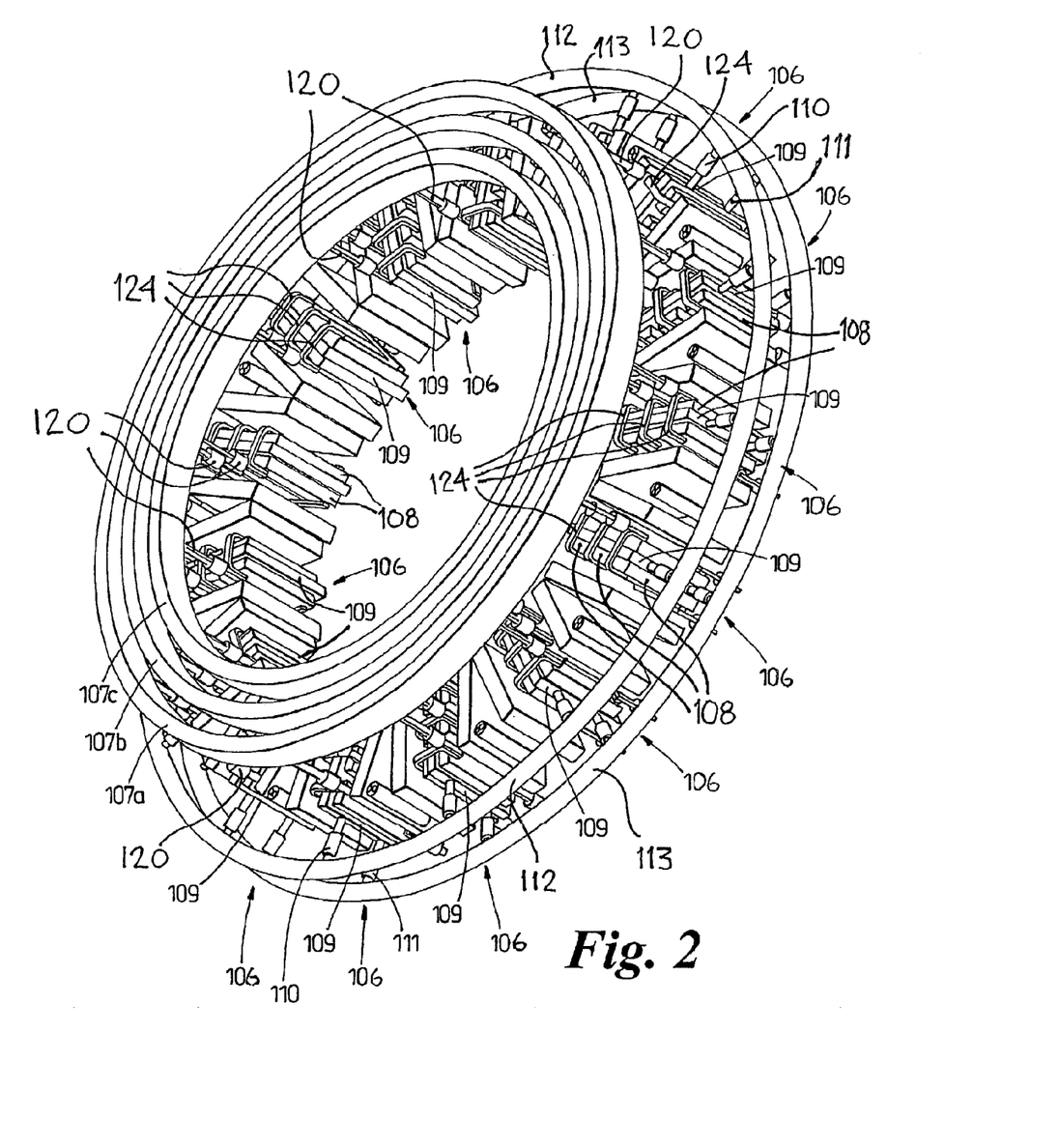
FIG. 2 is a more detailed perspective view of the power supply ring or busbar assembly and associated switch assemblies of the motor of FIG. 1.

The power supply ring assembly 107 comprises three tracks of conductive material in the form of nested concentric rings 107a, 107b and 107c. The rings 107a, 107b, 107c are formed by taking a flat strip of metal such as copper and bending it through a controlled curve, e.g., by a ring-rolling process between metal rollers as known, until the ends meet. The ends of the metal strip may be butt-welded or brazed together to complete the rings. The rings are concentric about the axis of rotation XX' of the motor 100. Each of the rings carries current from a different phase of a three phase supply around the motor to switching assemblies 106. In other arrangements, only two rings need be provided if the machine is supplied from a DC supply.

As also diagrammatically shown in FIG. 1, the switching assemblies 106 are connected between the ring assembly 107 and the above-mentioned ends of the winding conductors 103 at the left-hand end of the former 104 by means of electrical connections 120, 122 extending respectively from ring assembly 107 to switching assemblies 106 and from switching assemblies 106 to winding conductors 103.

Each switching assembly 106 comprises a number of semi-conductor switches 108. In the present embodiment, as shown in FIG. 2, there are a total of ninety switches 108 connected between the power supply ring assembly 107 and the stator windings 103. There are six switches 108 in each switching assembly 106, resulting in fifteen switching assemblies which are equiangularly spaced around the power supply ring assembly 107. Equal spacing of the switching assemblies is usually convenient for connection to the ends of the winding conductors, but spacing may be varied if necessary. The switches within each switching assembly are arranged as two sets, with three switches in each set. The two sets of switches in each switching assembly 106 are provided one on each opposed side of an electrically insulating substrate 109, which acts as a heatsink to help dissipate heat generated by the switches, as further explained below. It should be noted that in each switching assembly 106, the switches in the set on one side of the substrate 109 are paired one-to-one with the switches in the set on the other side of the substrate by means of electrical connections 124, and each such pair of switches is connected to a respective associated one of the three power supply rings 107a, 107b, 107c by a respective electrical connection 120 (compare FIG. 1). The location of the switching assemblies 106 are chosen to correspond with the circumferential locations of the ends of the stator windings 104.

Figure 3A:
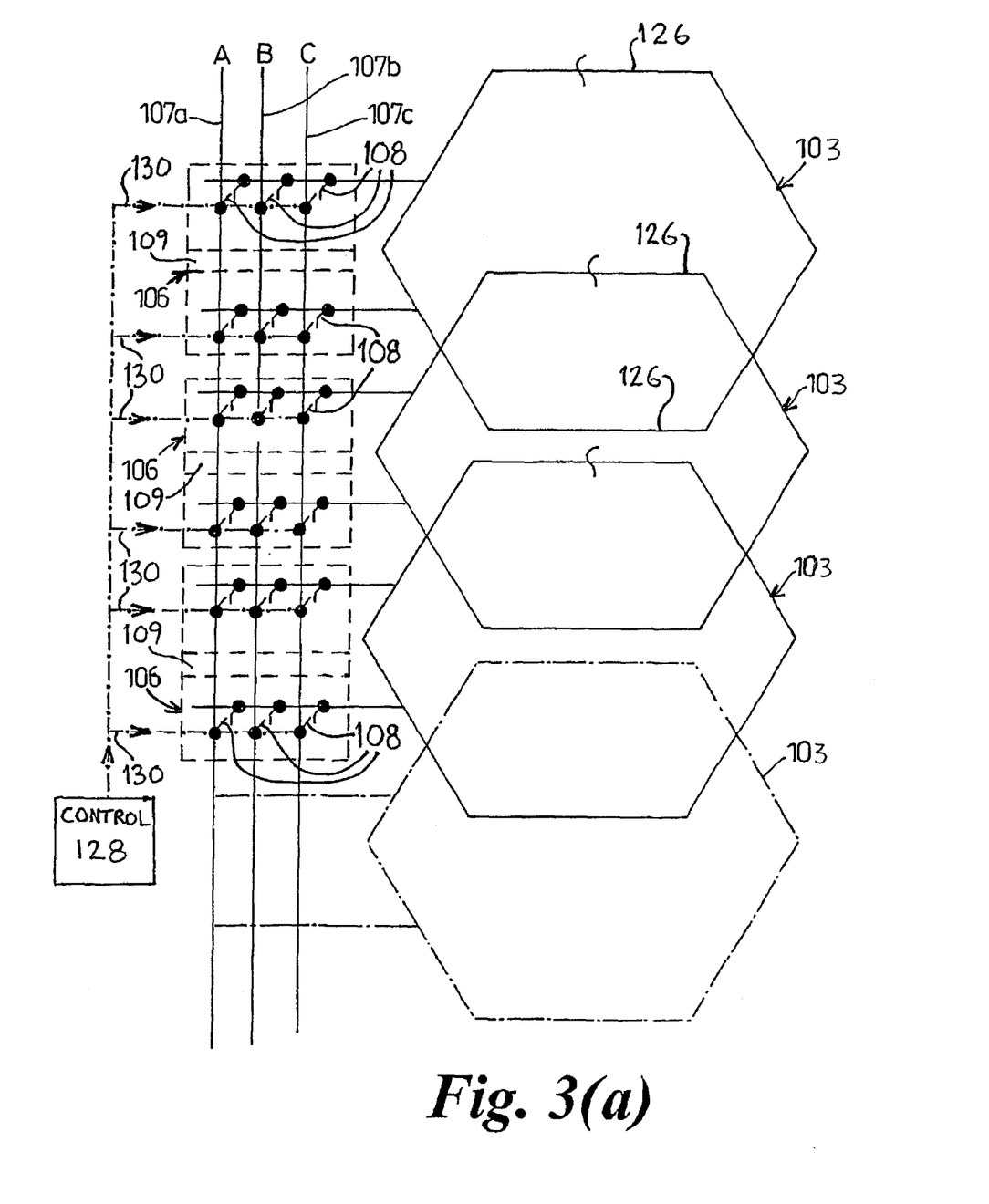
FIG. 3(a) is a circuit diagram illustrating the interconnection of the switches and field windings of the motor of FIG. 1.
Figure 3B:
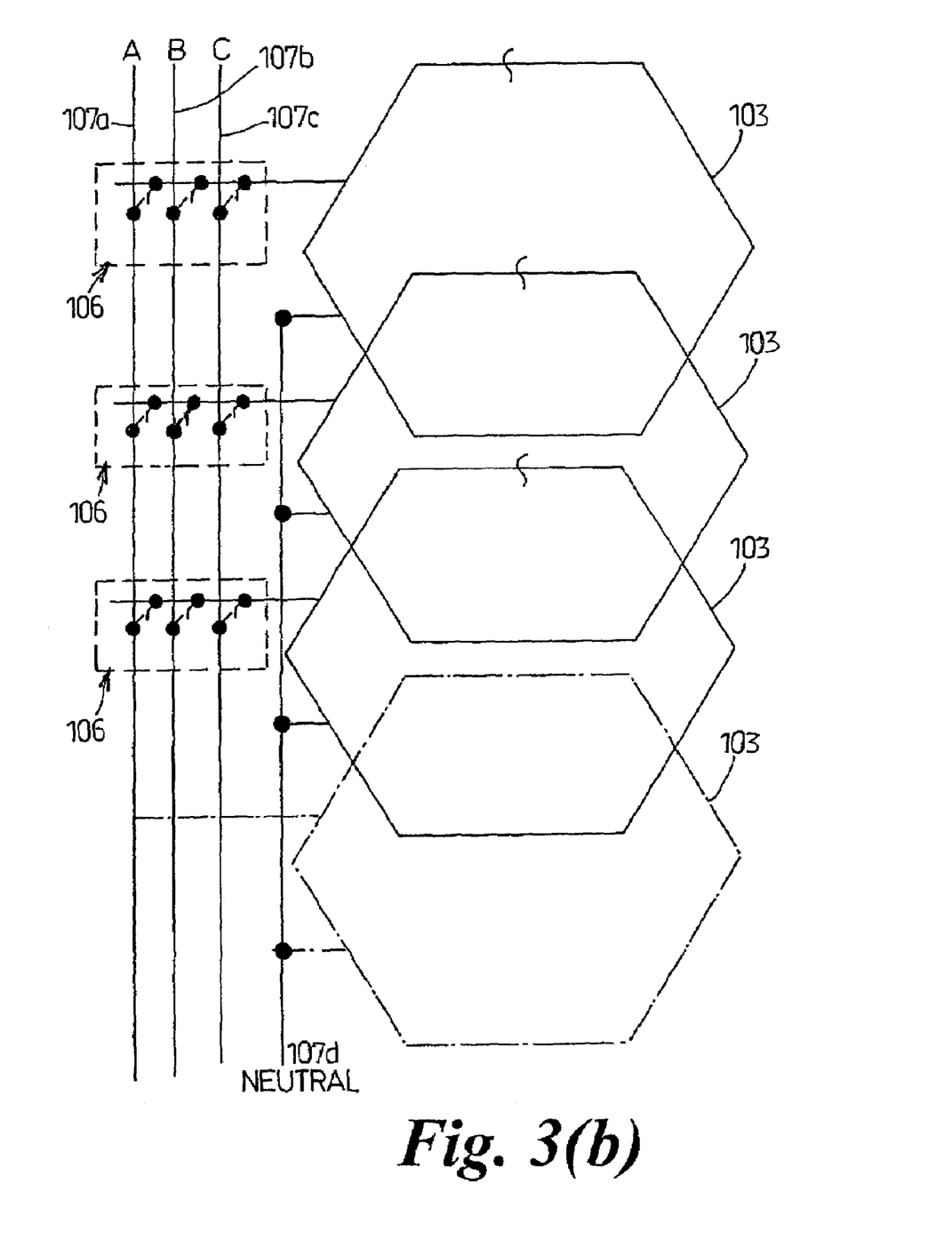
FIG. 3(b) is a circuit diagram illustrating an alternative interconnection of the switches and field windings of the motor of FIG. 1.
Figure 5A:
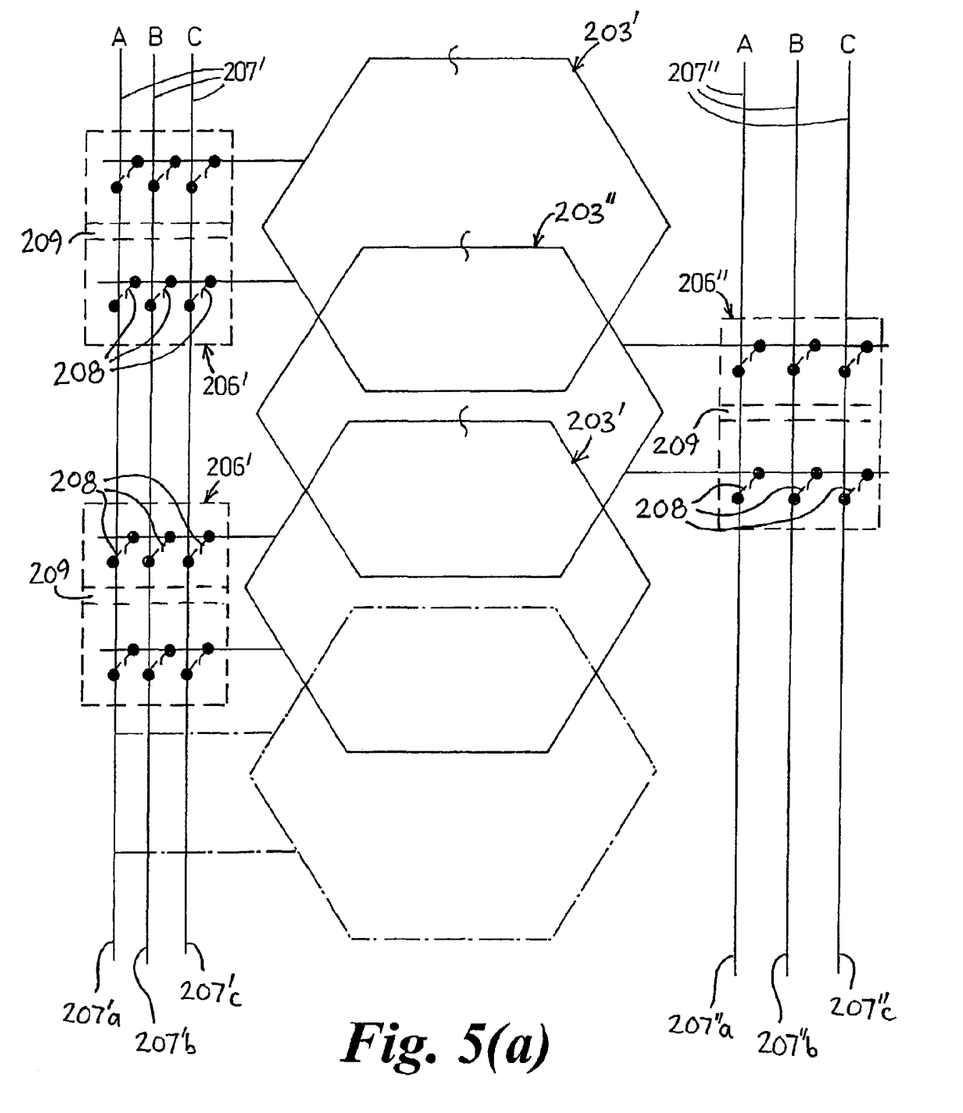
FIG. 5(a) is a circuit diagram illustrating the interconnection of the switches and the field windings in FIG. 4.
Figure 5B:
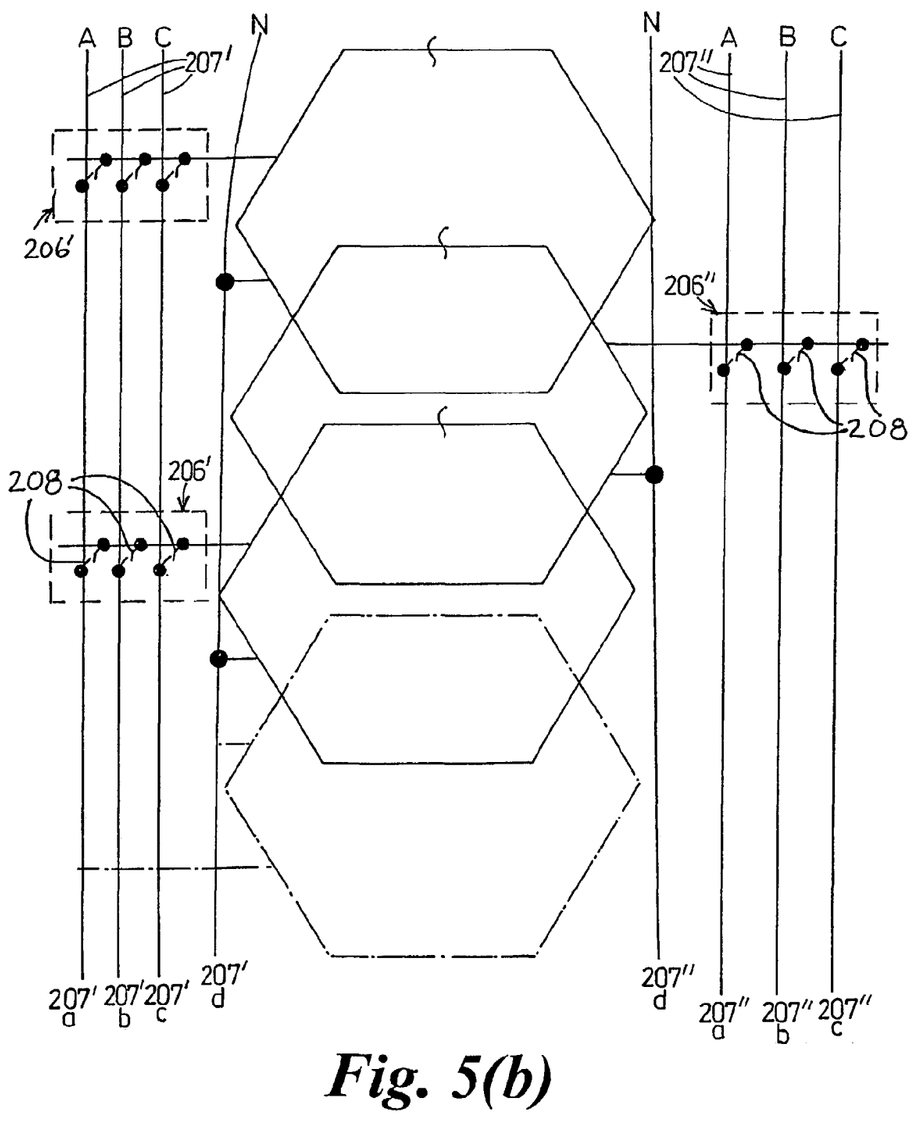
FIG. 5(b) is a circuit diagram illustrating an alternative interconnection of the switches and the field windings in FIG. 4.

The electrical arrangement of the windings and the switches is shown diagrammatically in FIG. 3(a) of the accompanying drawings, in which only a limited number of the windings 103 are shown. It will, of course, be appreciated that the windings have been flattened out into the plane of the sheet and their actual arrangement can better be represented by rolling up the page (drawing figures on the outside) about an axis parallel to the two side portions 126 of the windings. Also, in the example of FIG. 3(a), each winding only overlaps the two immediately adjacent windings. In practice the windings may overlap considerably more. Continuance of the windings in the same fashion around the rest of the stator in FIG. 3(a), and also in the following FIGS. 3(b), 5(a) and 5(b), is indicated by the chain-dashed winding shown at the bottom of each Figure.

Looking at FIGS. 2 and 3(a) together, and considering just one of the switching assemblies 106, the set of switches 108 on one side of the substrate 109 can be operated to selectively connect any one of the power supply rings 107a, 107b, 107c to one of the ends of a stator winding 103; this means that each switch 108 in the set can be signalled (or not) to connect a respective one of the rings 107a, 107b, 107c to the end of the winding. Similarly, each of the switches 108 on the other side of the substrate 109 selectively connect the other end of the same stator winding to a respective one of the power supply rings 107a, 107b, 107c.

The effect of the above described arrangement is that the three switches in each set allow each end of each winding to be connected to any of the input phases A, B, C at a given time. This allows complete control of the current flowing in the winding, and—if required—the electrical isolation of the end of the winding from the supply.

The switches 108 effectively replace the complicated wiring that is normally needed in multiphase rotating electrical machines to connect together the ends of groups of windings into phases. Because the switches can be set to alter the connection between windings and the phases A, B, C of the supply, a considerably more flexible machine is provided.

Since in a large machine the semi-conductor switches 108 must handle appreciable amounts of power in switching the currents between ends of windings, each substrate 109 is provided with a matrix of hollow channels (not shown) through which cooling fluid can be passed, the channels terminating in an inlet and an outlet port. As shown in FIG. 2, an inlet pipe 110 and an outlet pipe 111 extend respectively from the inlet port and the outlet port. The inlet pipe 110 is connected to a toroidal inlet manifold pipe 112 which runs in a ring around the outside of the switch assemblies. Similarly, the outlet pipe 111 is connected to a toroidal outlet manifold pipe 113 which runs concentric with and axially spaced from inlet manifold 112. Cool fluid is supplied along the inlet pipes and warm fluid is exhausted from the outlet pipes.

A control circuit arrangement 128, which may form an integral part of the motor assembly 100, or may be provided separately, generates control signals 130 which modulate each of the switches 108. In known fashion, the control circuit arrangement preferably generates a set of pulse width modulated signals that are applied to each of the semiconductor switches to control their operation. Such a control circuit arrangement may operate under program control, e.g., to achieve automatic adjustment of pulse characteristics using feedback of machine electrical parameters, with the option of manual override.

The switches also provide protection for each of the stator windings, and allow failed windings (for instance windings which have formed a short circuit either with themselves or another component) to be electrically isolated whilst continuing to operate the motor.

In a modification illustrated in FIG. 3(b), a fourth busbar in the form of an additional nested ring 107d (not shown in FIG. 2) is provided which connects one end of each of the windings to neutral. Only half the number of switches 108 is then required (one set of three in each switching assembly), which reduces complexity and heat generation in the switch assemblies, although the flexibility of the motor operation is similarly reduced.

Figure 4:
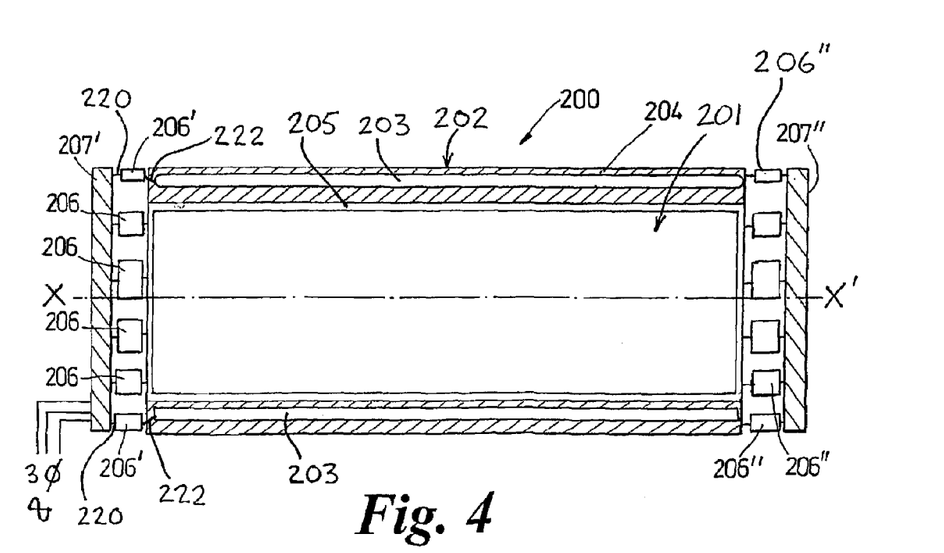
FIG. 4 is a part-sectional plan view of a further embodiment of an induction motor apparatus in accordance with the present invention.

A further embodiment is diagrammatically illustrated in FIG. 4 of the accompanying drawings and in FIG. 5(a), which shows the electrical equivalent circuit. In these Figures, components have been provided with reference numerals similar to those of corresponding similar components in FIGS. 1 and 3(a), but incremented by 100.

Instead of one ring assembly 107 provided at one end of the motor 100, two ring assemblies 207', 207" are now provided, one at each end of the motor 200—a total of six conductive tracks or busbars. The three additional ring conductors 207" also carry current from each of the three phases A,B,C of the electrical supply.

Between the additional ring conductors 207"a–c and the stator windings 203" are provided additional switching assemblies 206" in which the individual switches 208 are arranged together in two sets of three on either side of a substrate 209, as in the case of the first embodiment. The additional switches 206" are connected to the ends of the stator windings 203", i.e., to those windings to which the switches 206' are not connected. As shown, stator windings 203", which are connected to power supply ring assembly 207" via switch assemblies 206", alternate in circumferential sequence with windings 203', or groups of such windings 203', which are connected to power supply ring assembly 207' via switch assemblies 206'.

A modification of the arrangement of FIG. 5(a) is illustrated in FIG. 5(b), in which a single conductive ring connected to neutral is provided at each end of the stator so as to halve the number of switches required. One end of each winding is connected to the neutral ring whilst the other end is fed through the switching assemblies as in the arrangement of FIG. 3(b).

Figure 6A:
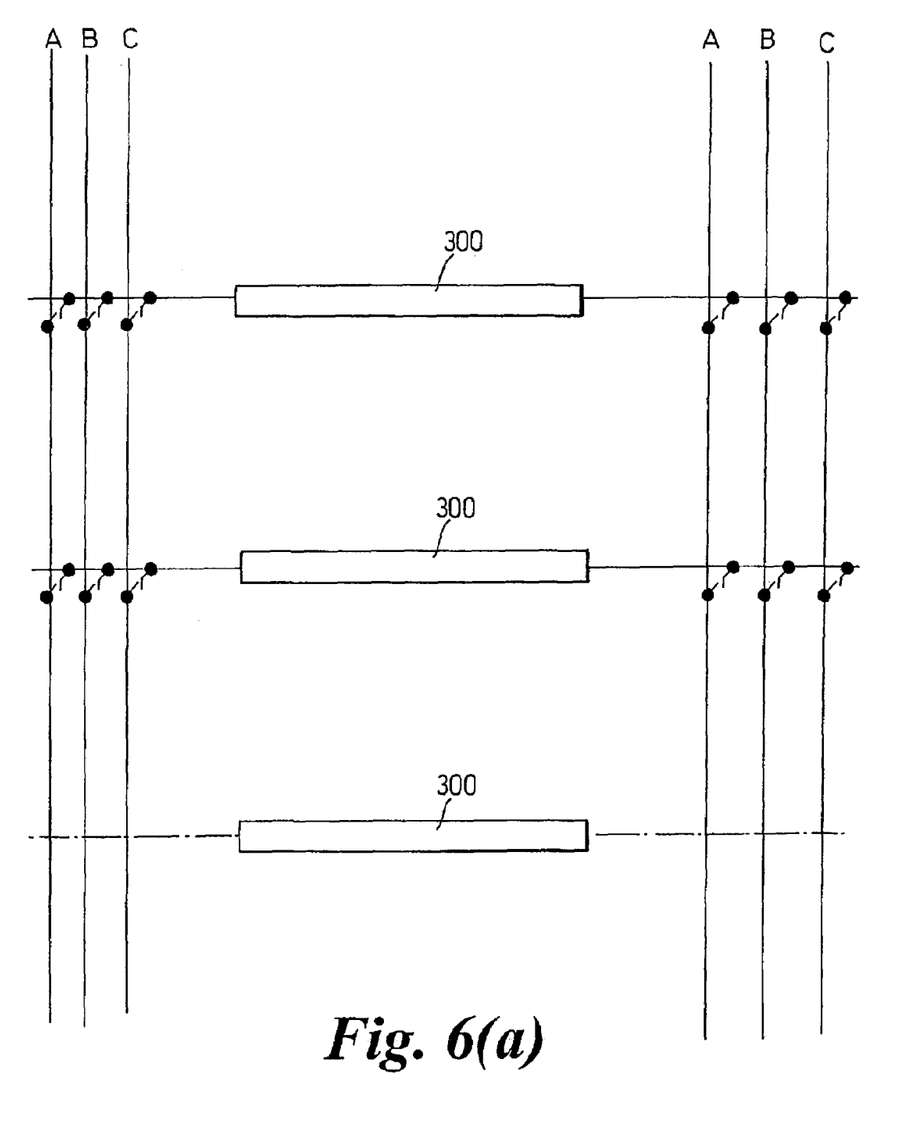
FIG. 6(a) is a circuit diagram illustrating the interconnection between the switches and field-generating conductors of a further embodiment.
Figure 6B:
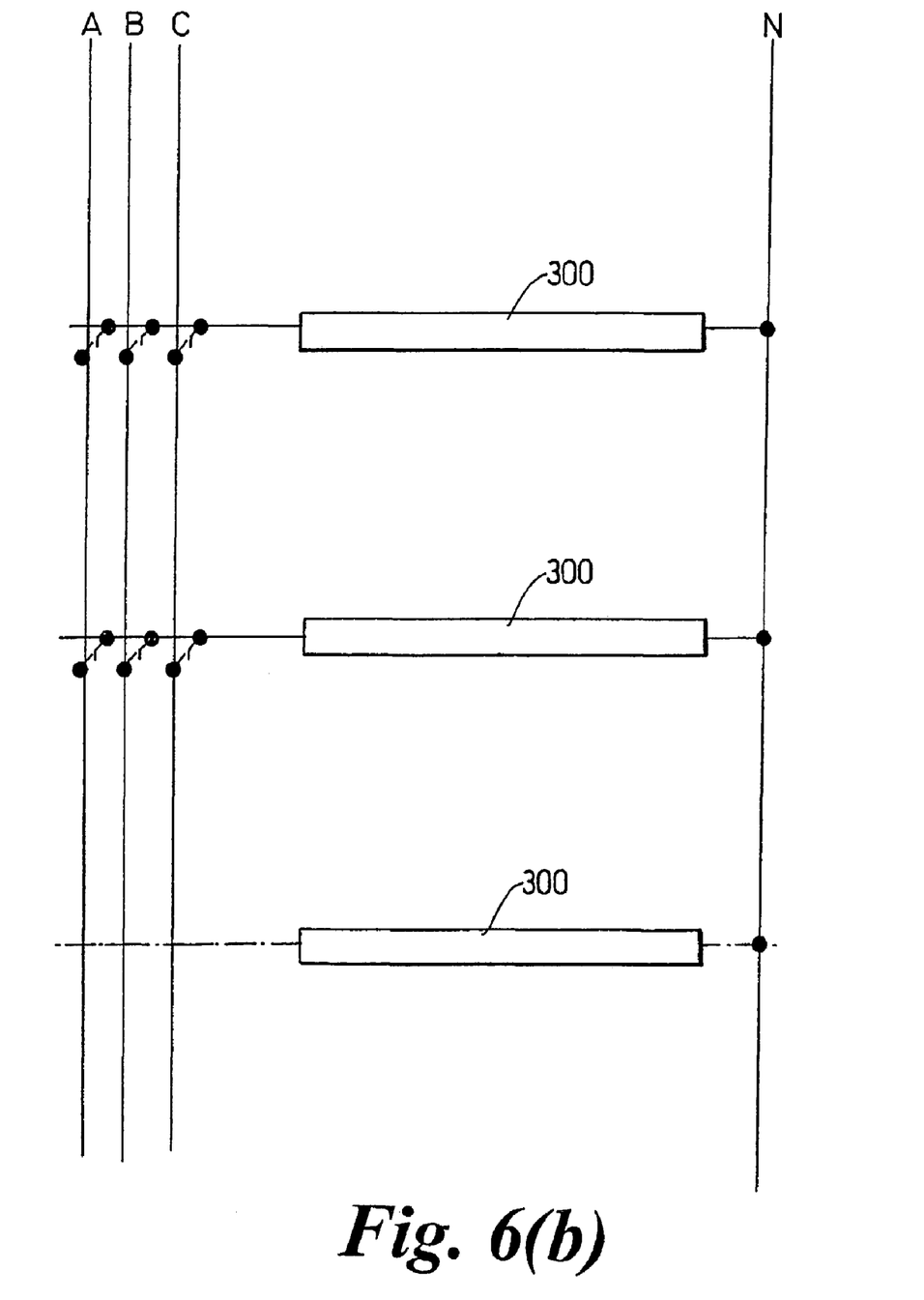
FIG. 6(b) is a circuit diagram illustrating a modification of the embodiment illustrated in FIG. 6(a)

An advantage of providing switches at each end of the stator is that it provides further improvements in the flexibility of the machine, by providing further options in protection, isolation and driving of the stator windings. Furthermore, it is now possible to eliminate the need for the windings to form loops. Instead, as illustrated in the diagrams of FIG. 6(a) and FIG. 6(b), which correspond generally to the wound coil arrangements of FIGS. 5(a) and 5(b) respectively, the conductors may comprise elongate bars 300 that extend axially from one end of the former to the other.

Figure 8:
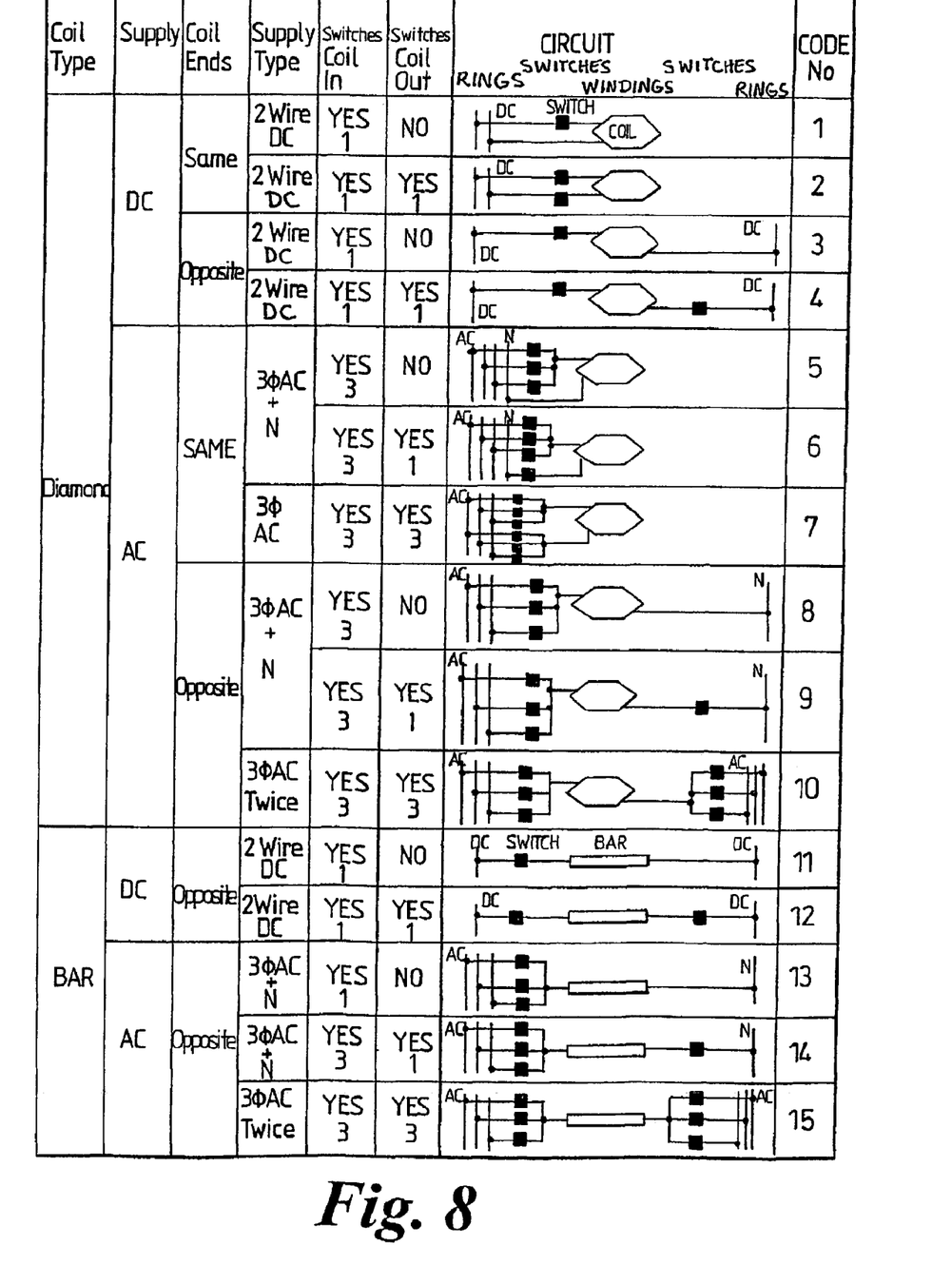
FIG. 8 is an overview of some of the possible configurations of windings, switching assemblies and power supply rings that are possible within the scope of the present invention.

The above examples are not intended to limit the scope of protection sought and the skilled person will appreciate that a large number of alternative configurations can be provided, at least some of which are as illustrated in FIG. 8 of the accompanying drawings. This shows that the power supply busbar rings can carry either a DC supply to the switching assemblies (2 rings), or a three phase AC supply (3 rings). In the case of DC supplies, the skilled person will realise that it is not necessary for each switching assembly to consist of any more than one switch. Optionally, for AC arrangements, an additional conductor for connection to a neutral point may be provided to simplify the switching assemblies.

Also, for each of the above alternatives a switch may be provided at each end of a winding or only at one end. Where a winding has switches at each end (at the input and output terminals), the control circuitry may be adapted to modulate only one of the switches to control the electrical waveform shape in the winding, or to control both the switches to provide isolation of the winding when required.

Alternatively, switches at both ends of the windings may be modulated to control the shape of the waveform in the windings.

Switch means and conductive rings may be provided at one end or both ends of the stator.

The windings may comprise individual conductors coiled from part of a loop to many times around the stator, or they may comprise single conductive bars that extend axially through the stator.

In the above-described preferred embodiments, each switching assembly, comprising a plurality of switches, is connected to only one of the windings or other field-generating conductors. However, it would alternatively be possible to connect a switching assembly to more than one winding, or even a group of windings, provided that the switches would be capable of handling the correspondingly increased currents flowing through them without overheating. The resulting economy in the number of switch assemblies would trade-off against decreased control flexibility and increased vulnerability of the machine to breakdown and malfunction in respect of the field windings.

Although the switch assemblies in the above embodiments have been described as being equi-angularly spaced around the stator of the electrical machine, the skilled person will realise that it would be possible to depart to some extent from such equality of spacing between switch assemblies without frustrating the objects or advantages of the invention.

Whereas the description of the above embodiments has focussed on the use of AC power supplies having 3-phases, it would of course be possible to utilise a two-phase supply or a supply having more than three phases, if this was thought to be desirable for some reason. The skilled person will of course realise that appropriate adjustment of the number of power supply rings and their associated switches would be necessary to match the number of phases being supplied.

The invention claimed is:

1. An electrical machine, comprising:
   a) a rotor rotatable about an axis;
   b) a stator circumferentially surrounding the rotor and having a plurality of field-generating conductors;
   c) at least one ring-shaped busbar for supplying power to the field-generating conductors, the at least one busbar being axially spaced at a spacing from the stator;
   d) a plurality of switch means angularly spaced apart around the axis and axially connected between the at least one busbar and the field-generating conductors, the switch means being axially located in the spacing between the at least one busbar and the stator; and
   e) control means for selectively operating the switch means to control current in the field-generating conductors and thereby control operation of the machine.

2. The electrical machine according to claim 1, in which said at least one busbar is provided at at least one axial end of the stator.

3. The electrical machine according to claim 1, in which additional ring-shaped busbars and said at least one busbar constitute a plurality of busbars arranged concentrically with each other at at least one axial end of the stator.

4. The electrical machine according to claim 3, in which the plurality of busbars is operative for supplying a corresponding plurality of electrical supply phases to the field-generating conductors, and in which each switch means comprises a corresponding plurality of switches, and in which the field-generating conductors are selectively connectable to any one of the plurality of electrical supply phases.

5. The electrical machine according to claim 1, in which a busbar is provided for each polarity of a DC input supply, and in which each switch means controls a connection between a respective field-generating conductor and a respective busbar.

6. The electrical machine according to claim 1, in which the field-generating conductors are supported by a former having a plurality of axially extending slots provided therein at circumferentially spaced locations, and in which the circumferentially spaced locations of the slots correspond to the spaced locations of the switch means.

7. The electrical machine according to claim 1, in which each switch means comprises a plurality of semiconductor switches.

8. The electrical machine according to claim 7, in which the switches of each switch means are supported by a respective electrically insulating substrate.

9. The electrical machine according to claim 8, in which the substrates comprise heat sinks.

10. The electrical machine according to claim 8, in which the substrates are in a heat-exchange relationship with heat sinks.

11. The electrical machine according to claim 10, in which the heat sinks are fluid-cooled through channels provided in the heat sinks.

12. The electrical machine according to claim 11, including toroidal inlet and outlet manifolds surrounding the switch means for conveying coolant fluid to and from the heat sinks.

13. The electrical machine according to claim 5, in which the busbars are supported by the stator.

14. The electrical machine according to claim 1, in which the field-generating conductors comprise coil windings.

15. The electrical machine according to claim 1, in which the field-generating conductors comprise straight bars.

16. The electrical machine according to claim 1, in which the at least one busbar and the plurality of switch means are mounted axially adjacent the stator and do not extend radially past the stator.

* * * * *